UNITED STATES PATENT OFFICE.

IGNAZ ROSENBERG AND KARL ELBEL, OF BIEBRICH, GERMANY, ASSIGNORS TO KALLE & CO., OF SAME PLACE.

GREENISH-BLUE POLYAZO DYE.

SPECIFICATION forming part of Letters Patent No. 613,640, dated November 1, 1898.

Application filed December 27, 1897. Serial No. 663,473. (Specimens.)

*To all whom it may concern:*

Be it known that we, IGNAZ ROSENBERG, a subject of the Emperor of Austria-Hungary, and KARL ELBEL, a subject of the King of Prussia, Emperor of Germany, doctors of philosophy, residing at Biebrich-on-the-Rhine, Germany, and assignors to KALLE & CO., of same place, have invented certain new and useful Improvements in the Manufacture of Greenish-Blue Polyazo Dyestuffs, of which the following is a specification.

In the United States Patent applied for on the 27th day of December, 1897, Serial No. 663,471, a new process for the preparation of primary disazo coloring-matters is described, consisting in the consecutive combination of two molecules of diazo compound with one molecule of 1.8.4.6 amidonaphtholdisulfo-acid (K) in an acid-reaction liquid. We have now found that if in the said process the second molecule of diazo compound is replaced by one molecule of the tetrazo derivative of one of the usual paradiamins an intermediate product is obtained which is still capable of uniting with one molecule of an amin or a phenol or of a sulfo or carbo acid of either of these. In this manner polyazo dyestuffs are produced which dye unmordanted cotton from a bath prepared with alkali or salt and wool from a neutral bath shades possessing considerable fastness. We have further found that especially those dyestuffs are of value which are obtained by acting with the above-described intermediate products upon one molecule of the usually-employed amidonaphtholmono or disulfo acids.

In the following we describe the manner of preparing such a polyazo dyestuff according to the new method.

Example: 14.3 kilos alpha-naphthylamin dissolved in thirty kilos hydrochloric acid and one thousand liters of water and ice are diazotized in the usual manner with seven kilos sodium nitrite. To this diazo solution a solution of 36.2 kilos neutral sodium salt of 1.8.4.6 amidonaphtholdisulfo-acid (K) in one thousand liters of water is added slowly. After about twelve hours' stirring the formation of the monoazo color is completed. After adding fifty kilos sodium acetate to the mixture containing the monoazo color partly separated out a tetrazo-diphenyl solution prepared from 18.4 kilos benzidin, fifty-four kilos hydrochloric acid, one thousand liters of ice-water, and fourteen kilos sodium nitrite is poured into it. The formation of the intermediate product is finished as soon as it is separated out completely as a greenish-black precipitate and as soon as the liquor has turned almost colorless, which is the case after about half an hour. Twenty-four kilos of 2.8.6 amidonaphtholsulfo-acid (G) dissolved in about four hundred liters of water under addition of eleven kilos soda-ash are now added to the intermediate product. The formation of the coloring-matter is finished after a short while. The mass is then heated up and the dyestuff precipitated from it completely by salting out. It represents a grayish-black powder, showing a bronzy luster, and dyes unmordanted cotton a deep greenish blue. It dissolves in concentrated sulfuric acid with blue coloration and is separated from such solution by addition of water as a greenish-black precipitate.

In alcohol the dyestuff is insoluble.

What we claim is—

1. As a new method of manufacture the preparation of a polyazo dyestuff by combining one molecule of alpha-diazonaphthalene with one molecule of 1.8.4.6 amidonapththoldisulfo-acid (K) in presence of free mineral acid to a monoazo color, by acting upon this monoazo color in presence of free acetic acid with one molecule of tetrazo-diphenyl and uniting the so-formed intermediate product with 2.8.6 amidonaphtholsulfo-acid (G) in presence of alkali, as hereinbefore described.

2. The new dyestuff herein described derivable from 1.8.4.6 amidonaphtholdisulfo-acid (K) which consists of a grayish-black powder of bronzy luster easily soluble in water, insoluble in alcohol, soluble in concentrated sulfuric acid with blue coloration, and which dyes unmordanted cotton a deep greenish blue.

In testimony whereof we have signed our names to this specification in the presence of two subscribing witnesses.

IGNAZ ROSENBERG.
KARL ELBEL.

Witnesses:
C. REINHARD,
JACOB ADRIAN.